May 6, 1958     S. D. POOL ET AL     2,833,367
SWINGABLE OPERATOR'S STATION FOR IMPLEMENT CARRIER
Filed Aug. 30, 1955     2 Sheets-Sheet 1
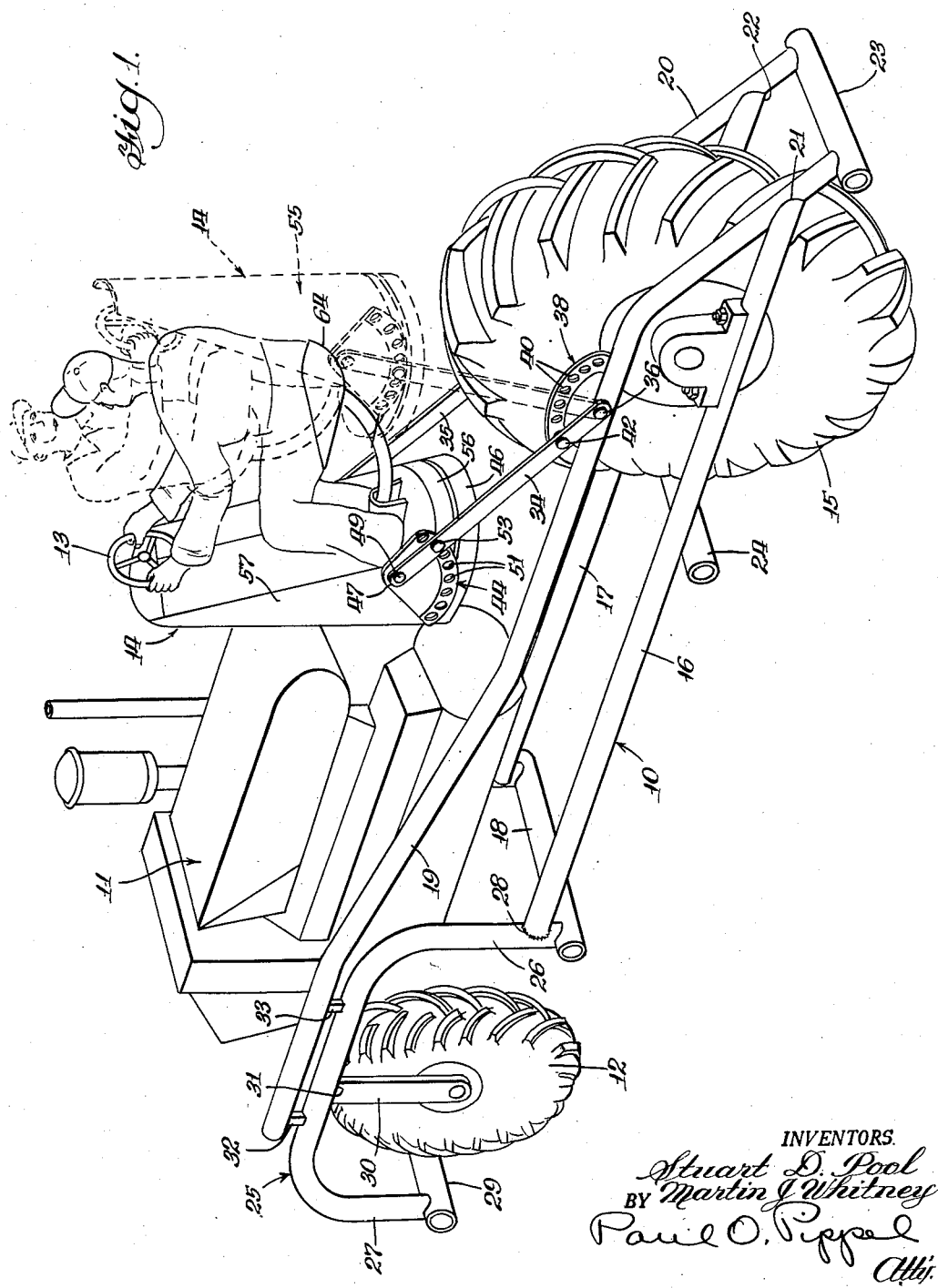
INVENTORS.
Stuart D. Pool
BY Martin J. Whitney
Paul O. Pippel
Atty.

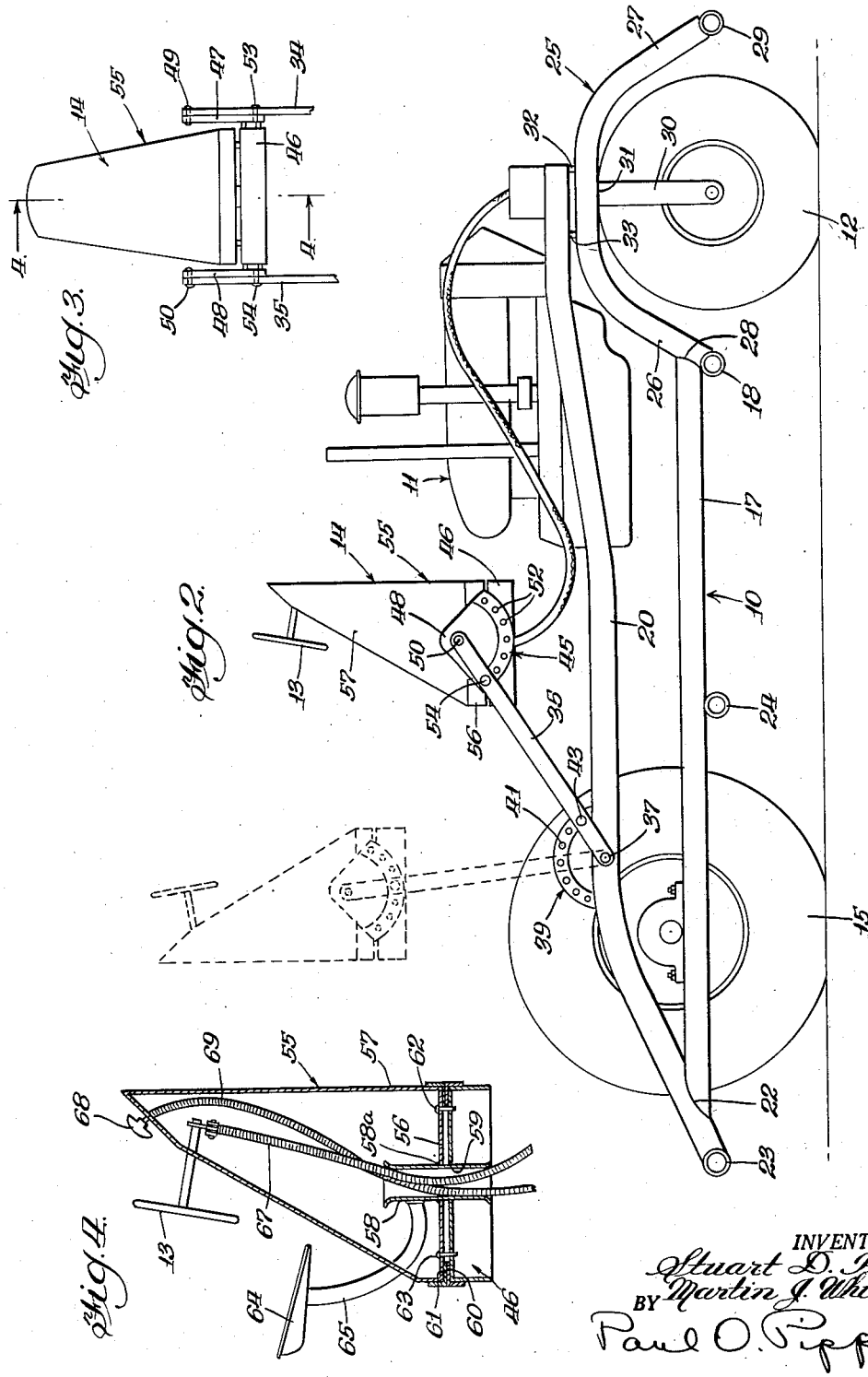
INVENTORS.
Stuart D. Pool
Martin J. Whitney
BY Paul O. Pippel
Atty.

United States Patent Office 2,833,367
Patented May 6, 1958

2,833,367

SWINGABLE OPERATOR'S STATION FOR IMPLEMENT CARRIER

Stuart D. Pool and Martin J. Whitney, Moline, Ill., assignors to International Harvester Company, a corporation of New Jersey Application August 30, 1955, Serial No. 531,531

1 Claim. (Cl. 180—77)

This invention relates to a new and improved swingable operator's station for implement carrier.

The present-day agricultural tractors are undergoing severe evolution and manufacturers find it is more and more difficult to satisfy the farmer's needs as to his movable power plant whether for traversing fields or supplying stationary power to devices. Operating a farm is becoming just as complex as any highly specialized industry and the equipment supplied to the farmer must keep pace with this complex development of farming principles. These are some of the questions that the farmer is undoubtedly asking himself. Should I buy a three-wheel farm tractor or should I buy a four-wheel farm tractor? Another seemingly necessary feature in tractors or other power units is whether or not it will operate equally well in both directions. Also, if it does run in two directions is it possible to conveniently reverse the operator's station so that he is facing forwardly in the direction of travel regardless of which direction the tractor or power unit is moving. In more recent years the tractor has been and is being converted to a vehicle which will not only act to pull implements through the fields but also permit direct mounting of the implements thereon. In some instances the tractors are no longer pulling implements at all but are mainly for carrying implements. These then have been called implement carriers and it is generally with this type of machine with which the present invention is most concerned. The present invention makes for versatility of implement carriers and tractors of any type.

A principal object of the present invention is to provide an operator's station on an implement carrier or the like wherein the operator's station may have generally universal positioning on the carrier.

An important object of this invention is the provision of means on a farm implement carrier of a swingable operator's station whereby the operator may be positioned anywhere relative to the implement carrier to produce the most advantageous operating location regardless of the implement being carried and/or the direction of movement of the implement carrier.

Another important object and advantage of this invention is to supply an operator's station for tractors or the like wherein the station is mounted on a hinged arm with swingable movement throughout substantially 180° for adjustable positioning of the operator's station throughout the semi-circular path of the hinged arm.

Still another important object of this invention is to equip a swingable operator's station with a turntable platform to effect a positioning of the operator in either of two opposite directions whereby the operator may be facing in the direction of movement of the tractor regardless of the direction in which the tractor is moving.

A still further important object of this invention is to provide on a rotating operator's station a central tubular portion for the passage of necessary operating cables to effect steering, gear shifting, braking and clutching.

Another and still further important object of this invention is the provision of means on a two-wheel implement carrier of a combination swingable operator's station and turntable platform wherein the operator may adjustably position his station relatively fore and aft of the two-wheel implement carrier, relatively vertically with respect to the implement carrier, and finally may rotate the turntable platform as desired to effect a positioning of the platform and its operating controls either frontwardly or rearwardly so that the operator may be facing in a forward direction regardless of the direction of movement of the two-wheel implement carrier.

Other and further important objects and advantages will become apparent from the disclosures in the following specification and accompanying drawings.

In the drawings:

Figure 1 is a perspective view of the swingable operator's station as applied to an implement carrier;

Figure 2 is a side elevational view of the device as shown in Figure 1;

Figure 3 is a front elevational view of the operator's station employed in the device of Figures 1 and 2, and Figure 4 is a sectional view taken on the line 4—4 of Figure 3 and showing a transverse sectional view through the operator's platform.

As shown in the drawings the reference numeral 10 indicates generally a frame structure on which is mounted an engine 11, a front wheel 12 which is steerable by means of a hand-steering wheel 13 located on an operator's station identified broadly by the numeral 14. The rearward end of the frame structure 10 is carried by a large traction wheel 15 which is driven by the engine 11. The implement or vehicle generally is termed an implement carrier in which the dirigible wheel 12 and the large rear traction wheel 15 are in alignment one with the other such that they will operate in the same track.

The frame structure 10 is generally provided with side tubular frame members 16 and 17 which lie parallel one to the other and straddle the rear traction wheel 15. The forward end of the tubular frame members 16 and 17 are joined by a cross tubular member 18 as best shown in Figure 1. A second pair of tubular members 19 and 20 are generally disposed directly above the tubular frame members 16 and 17 respectively and extend from the engine end of the implement carrier to the traction wheel end of the implement carrier. The rearward end of the side frame members 19 and 20 join with the tubular frame members 16 and 17 at 21 and 22. A transversely disposed short tubular member 23 spans the space between the side tubular frame members and is weldably attached to both side frame members at the outer ends of the tubes 19 and 20 which project beyond the junctures 21 and 22 with the lower side frame members 16 and 17. Another cross tubular frame member 24 is weldably attached to the underside of the frame members 16 and 17 just forwardly of the traction wheel 15. Thus the transverse tubular members 23 and 24 define an enclosure for the large traction wheel 15 along with the combined side frame members 16 and 19 and 17 and 20. Although the large traction wheel 15 has at times been stated to be at the rear of the implement carrier of this invention it is to be understood the wheel may be at the rear or at the front depending upon which direction the implement carrier is traveling. In the full line position of the device as shown in Figure 1 the implement carrier is running in a direction in which the dirigible or steerable wheel 12 is at the front end. Thus in that position the large traction wheel 15 is disposed at the rear of the implement carrier and is correctly described as positioned at the rear. However, it will be evident from the dash line position of the operator's station and the operator thereon in the device as shown in Figure 1 that the implement carrier may run with the large traction wheel at the front end and thus this would be just the reverse of that shown in full lines so that the traction wheel may be either at the front or the rear of the implement carrier.

The frame structure at the steerable wheel and of the implement carrier comprises an inverted U-shaped tubular frame member 25. The inverted U-shaped frame member 25 has downwardly extending leg members 26 and 27. The leg 26 is adapted to extend downwardly and is weldably attached to the transverse tubular frame member 18. Still further the end of the tubular frame member 16 which extends longitudinally of the side of the implement carrier is weldably attached at 28 to the leg 26. The bottom of the leg 27 joins a transverse tubular member 29 which lies parallel to the member 18 and spaced therefrom to provide an enclosure for the steerable wheel 12 of this implement carrier. A support 30 extends downwardly from the top of the U-frame 25 at 31 to carry the steerable wheel 12. The upper tubular frame member 19 projecting along the side of the implement carrier is made unitary with the remaining frame structure by reason of interconnecting members 32 and 33 which join the end of the tubular member 19 to the top portion of the inverted U-frame member 25. Only one side of the implement carrier frame has been shown in its entirety but it should be understood that the other side of the carrier is identical in construction.

The implement carrier of this invention is thus a two-wheel vehicle capable of running in either direction and further capable of having implements of the agricultural variety or otherwise attached to either side or both sides as desired. However, the details of the implements to be attached to a carrier of this type and the means for effecting attachment to this carrier do not form a part of this invention. The carrier having only two wheels needs auxiliary support to make it stable. The attaching implements which may be equipped with wheels such as outrigger wheels, ideally perform this stabilizing function. We are concerned here only with the swingable operator's station as shown at 14. The operator's station is carried on a pair of spaced-apart arms 34 and 35 which are pivoted on the frame structure 10 at 36 and 37 respectively. Quadrants 38 and 39 are fixedly mounted on the tubular frame structures 19 and 20 respectively and have aligned openings 40 and 41 spaced generally at regular intervals around the full arcuate length thereof. First removable or retractable pin means 42 and 43 are adapted to be passed through the arms 34 and 35 and engage any one of the openings 40 and 41 in the quadrants 38 and 39. By this means the operator's station 14 may be swung throughout the full arcuate range defined by the quadrants 38 and 39 and may be held in any desired position throughout this length by means of the pins 42 and 43 engaging any one of the openings 40 and 41 in the quadrants. In the position of the device as shown in Figure 1 the operator's station 14 is positioned between the implement carrier engine 11 and the large traction wheel 15. In the dash line position of the operator in this same view the station 14 has been swung to a position over the large traction wheel 15 and on the side away from the engine 11. The arcuate range of movement of the operator's station 14 obtains both fore and aft movement of the station on the implement carrier and also up and down movement on the implement carrier. Therefore the station may not only facilitate fore and aft positioning of the operator, but may also elevate the operator to effectively control relatively high implements which may be mounted thereon.

In cooperation with the first quadrants 38 and 39 on the inner ends of the operator's station carrier arms 34 and 35 there are provided second quadrants 44 and 45 fixedly mounted on opposite sides of a stationary portion 46 of the carrier 14. The quadrants 44 and 45 which are fixedly attached to the stationary base member 46 of the operator's platform 14 have upwardly extending projections 47 and 48 respectively. The outer extremities of the arms 34 and 35 are pivotally attached to these quadrant extensions 47 and 48 at 49 and 50. The lower portions of the quadrants 44 and 45 are arcuate in shape and are equipped with a plurality of openings 51 and 52 following the arcuate path of the lower portions thereof. Second removable or retractable locking pins 53 and 54 are adapted to pass through the arms 34 and 35 respectively and engage one of the openings 51 and 52 in the quadrants. The placement of the pins 53 and 54 for a level platform is of course limited depending upon the placement of the pins 42 and 43 in the lower quadrants 38 and 39. Of course by proper placement of the pins 53 and 54 the operator's platform may be maintained horizontally level for the convenience of the operator regardless of the angular position of the arms supporting the operator's carrier station.

The operator's station 14 additionally is provided with an upper portion 55 which has a bottom 56 and a wrap-around type of enclosure 57 within which the operator stands or sits. As best shown in Figure 4 the base 56 of the portion 55 of the carrier 14 is equipped with a central tubular member 58 which is fixedly fastened thereto by a weld or the like 58a and projects downwardly through an opening 59 in the stationary portion 46 of the operator's station. It is the object of the two-part operator's station to permit the upper part 55 to be rotated relatively to the stationary portion 46. In order to accomplish this rotating of the part 55 relative to the part 46 annular tracks in the form of angle members 60 and 61 are provided respectively on the part 46 and the part 55 around the bottom of the base 56 thereof. As best shown in Figure 4 the track members 60 and 61 ride one on top of the other and there may be rotation on the part 55 relative to the stationary part 46. In order to lock the part 55 in adjusted position relative to the part 46 pins 62 and 63 are adapted to be passed downwardly through openings in the base 56 of the movable part 55 and thence into aligned openings in the base portion 46 provided therefor. Thus when the operator's station 14 is moved to its desired position the pins 62 and 63 are replaced causing the movable part 55 to remain fixed relative to the stationary part 46. It is only necessary to rotate the part 55 of the operator's station 14 when the direction of the implement carrier is reversed. In the direction of the implement as shown in full lines in Figure 2 the carrier 14 is facing toward the steerable wheel end of the carrier, whereas in the dash line position in the same view the operator's carrier 14 is facing in the direction of the traction wheel end of the carrier.

An operator's seat 64 having a supporting member 65 is mounted on the central tubular member 58 so that as the portion 55 of the station 14 is rotated the seat 64 will also be rotated. The user of this device may thus always face in the direction in which the implement carrier is running. The handle, or steering wheel 13 is mounted on the wrap-around portion 57 of the rotating part 55 of the carrier station 14. This steering wheel is journalled in such a manner that by means of a flexible cable or the like 67 which passes downwardly through the centrally disposed tubular member 58 the connection to the dirigible wheel 12 of the carrier is completed. Thus the steering wheel 13 may be rotated to effect a direct angular positioning of the steerable wheel 12. Similarly the transmission is controlled by a hand lever 68 which is mounted in the wrap-around supporting member 57 and is joined with a flexible cable 69 which also passes downwardly and through the centrally disposed tube 58 whereupon it is carried forwardly to the transmission of the implement carrier of this invention. The fact that these cable controls 67 and 69 pass through the centrally positioned tubular member 58 permit the rotation of the carrier station portion 55 without interference with the control of the cables. Thus there is no interference with the operation of the steering wheel or the shifting of the transmission gears even though the implement carrier is running in opposite directions at different times and the operator's station is facing one of two directions. This of course is an important factor in the successful operation of the device of this invention. It is always difficult to remotely position an operator and enable him to effectively control the operation of a vehicle. In the present device the operator has been shown to be adjustably positionable fore and aft of the implement carrier and also vertically in combination with a reversing position in any of the locations of the station with corresponding controls which are not affected despite the various positions which the operator's station may assume. The cables 67 and 69 generally extend around and down past a position adjacent the hinge points 36 and 37 of the swinging arms 34 and 35 so there is no great change in length of the cables when the station is shifted and thus this facilitates adjustment of the station without interference with the controls in the same manner as the rotation of the platform is permitted by reason of the passage of the cables through the centrally disposed tubular member 58.

Numerous details of construction may be varied throughout a wide range without departing from the principles disclosed herein and we, therefore, do not propose limiting the patent granted hereon otherwise than as necessitated by the appended claim.

What is claimed is:

A shiftable operator's station for vehicles having a longitudinally extending frame structure, comprising arm means hingedly mounted near one end of said longitudinally extending frame structure for fore and aft swinging movement through a longitudinally extending vertical plane, first quadrant means affixed to said frame structure and arranged and constructed for holding said arm means in any desired vertical angular adjustment, first retractable pin means associated with said arm means for engaging said first quadrant means, an operator's platform having a lower portion and an upper portion, second quadrant means affixed to the lower portion of said operator's platform, means hingedly mounting the outer free end of said arm means onto said second quadrant means for fore and aft swinging movement, second retractable pin means associated with said arm means for engaging said second quadrant and holding said lower portion of the operator's platform in desired angular adjustment with respect to said arm means, said upper portion of the operator's platform having vehicle operating controls thereon, and means rotating said upper portion of the operator's platform in a horizontal plane with respect to the lower portion of the operator's platform, and means holding said upper portion in desired adjustment with respect to the lower portion.

References Cited in the file of this patent

UNITED STATES PATENTS

| | | |
|---|---|---|
| 178,725 | Brintnall | June 13, 1876 |
| 859,907 | Arnt | July 16, 1907 |
| 2,384,890 | Coldwell | Sept. 18, 1945 |
| 2,388,873 | Schwab | Nov. 13, 1945 |
| 2,422,813 | Walch | June 24, 1947 |
| 2,606,078 | Brock | Aug. 5, 1952 |
| 2,607,432 | Lommel | Aug. 19, 1952 |
| 2,715,938 | Miller | Aug. 23, 1955 |